UNITED STATES PATENT OFFICE.

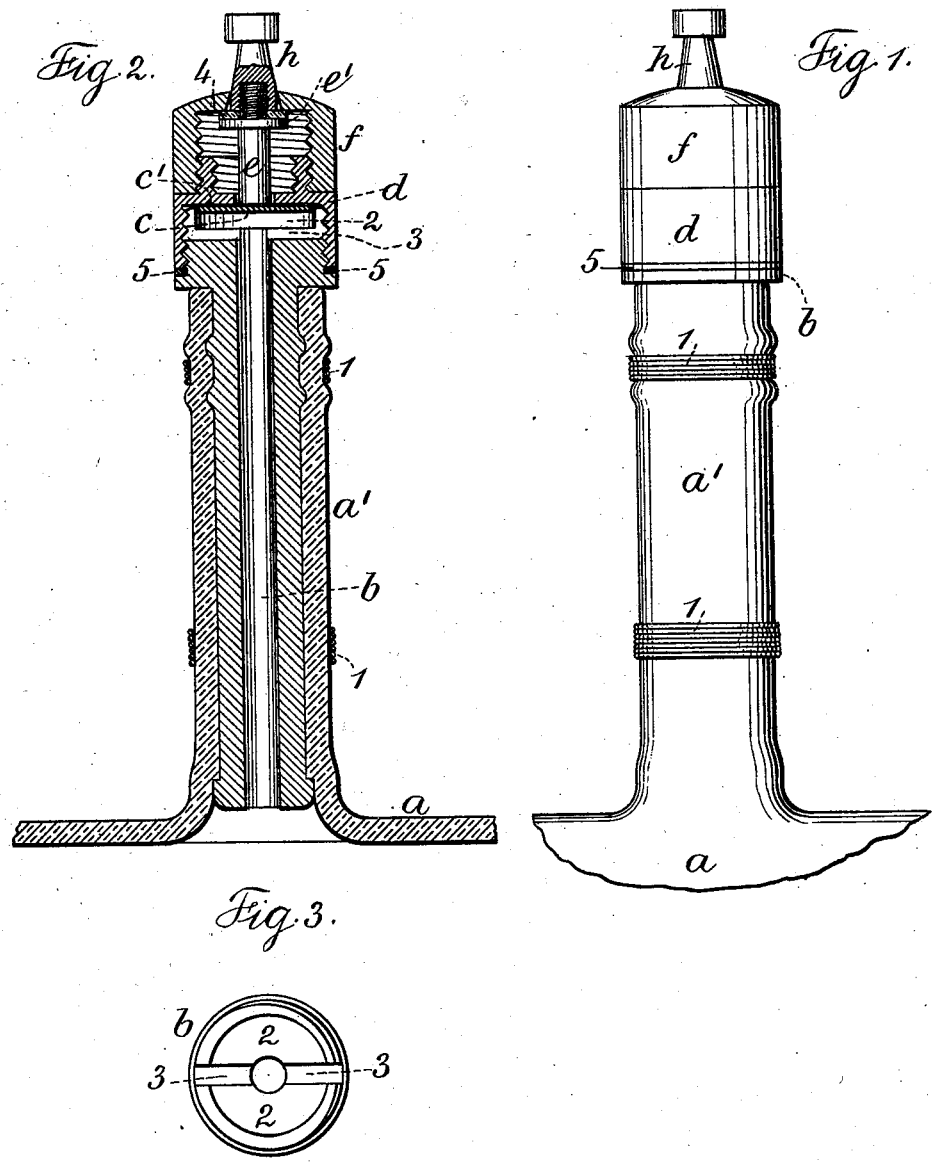

EMIL FRITSCHLE, OF NEW YORK, N. Y., ASSIGNOR TO HIMSELF AND JOSEPH SCHOTTMULLER, OF SAME PLACE.

VALVE FOR PNEUMATIC TIRES.

SPECIFICATION forming part of Letters Patent No. 603,269, dated May 3, 1898.

Application filed October 10, 1896. Renewed September 8, 1897. Serial No. 650,981. (No model.)

*To all whom it may concern:*

Be it known that I, EMIL FRITSCHLE, a citizen of the United States, residing at New York, in the county and State of New York, have invented a new and useful Improvement in Valves for Pneumatic Tires, of which the following is a specification.

Various forms of valves for pneumatic tires have heretofore been employed. Many of these are complicated, and in most all instances there has been but one place at which the air was sealed in the valve, and when it was desired to allow air to escape from the pneumatic tire through the valve because of the tire being too full the cover of the valve had to be removed and an additional instrumentality employed for releasing the air.

In my improvement the valve contains two seats or places at which the escape of air is prevented, and said valve also contains a means by which the air is allowed to escape if the pressure in the tire is too great.

In carrying out my invention and in combination with the pneumatic tire and a short length of rubber tube connected thereto and projecting therefrom I employ a tubular stem threaded at the outer end to receive a perforated cover and recessed at the outer end to receive a disk and transversely slotted below the recess. A perforated cap screws upon the top of the end of the cover, and I employ a stem having a disk and a head connected therewith and a washer between the head and the disk. The head projects through the cap, and the washer finds a seat on the under side of the cap. The disk finds a seat on the under side of the cover, and when both the disk and the washer are against their seats the stem, which passes through the cap and through the opening in the cover, just touches the surface of the disk.

The air-pressure in the tire forces the disk to its seat against the under side of the cover and simultaneously forces the washer that surrounds the stem in the cap to its seat, thus closing the exit of air at two places, and in case the air-pressure in the tire is too great a pressure by the finger on the exposed end of the head outside of the cap forces the disk and washer from their seats and allows the air to pass out through the slotted base in the outer end of the tubular stem, and the escape of air is regulated entirely by the pressure or movement of the finger.

In the drawings, Figure 1 is an elevation representing my improvement. Fig. 2 is a vertical cross-section of the same, and Fig. 3 is a plan of the outer end of the tubular stem. These figures are shown of exaggerated size.

A portion of the pneumatic tire is shown at $a$, and the small rubber tube connected thereto and projecting upon the surface of the tire is shown at $a'$. The tubular stem $b$ is received within the rubber tube $a'$, and cords or wires are employed at 1, around the rubber tube, to bind the same to the tubular stem. This is the usual manner of connection. The outer end of the tubular stem is enlarged and the surface threaded, and the end is recessed at 2 to receive the disk $c$, which moves freely therein, and said stem is slotted transversely at 3 below the base of the recess, and I prefer to employ a washer at 5 at the base of the exteriorly-threaded surface of the stem.

The cover $d$ is centrally perforated and adapted to screw upon the end of the tubular stem, its edge coming down upon the washer 5, and the flat inner and under surface of said cover forms a seat for the disk $c$. The outer end of the cover, of reduced size, is threaded to receive the cap $f$, and the interior of this end is threaded in the usual manner to receive the nipple at the end of the flexible pipe of an air-pump. The cap $f$ is centrally perforated, and I employ a stem $e$, having a disk $e'$ and screw-threaded end, and around the screw-threaded end upon the surface of the disk is a washer 4, and the head $h$ extends through the perforated end of the cap and screws upon the end of the stem down to the washer 4, the parts thus being connected.

In the position shown in Fig. 2 the disk $c$ is held against the flat under surface of the cover $d$ by the air-pressure within the tire. This forces the stem $e$ and head outwardly, and the stem, its disk, and washer are purposely made of just a length to agree with the distance from the surface of the disk $c$ to the under surface of the cap $f$ when the disk $c$ is seated by pressure against the flat under surface of the cover, so that in this position of the parts the escape of the air confined within the tire is prevented both at the contact of the disk and cover and also the washer 4 and under side of the cap $f$.

When it is desired to introduce air into the tire, the cap $f$ is unscrewed from the cover $d$, carrying with it the stem $e$ and head $h$ and attached parts. The nipple of the air-pump tube is screwed into the central portion of the cover, and as the air is forced by the pump the disk $c$ passes down to the base of the recess and the air forced into the tire passes around the disk and into the tubular stem through the transverse slot 3. Should the pressure in the tire become too great, because of expansive action under increased temperature, the finger can be placed against the exposed end of the head $h$ and the same pressed downward. This will cause the stem $e$ to act upon the surface of the disk $c$ and force the same down into the recess 2 and at the same time, because the head $h$ is tapering, to expose the opening in the end of the cap $f$. The air confined then rushes through the transverse slot 3 around the disk $c$, through the opening in the cover $d$, and out by the opening in the cap around the head. This escape of air is regulated entirely by the extent of pressure of the finger, and the air may be relieved in a mass or in short puffs, as required, to reduce the pressure within the tire. The disk $c$, received within the recessed end of the tubular stem, may be made of any desired material capable of withstanding the air-pressure and preventing the escape of the confined air. I, however, prefer to make the same from a piece of sheet-aluminium, with a thin strip of rubber $c'$ cemented thereto to insure an air-tight contact with the under surface of the cover $d$.

I claim as my invention—

1. In a valve for pneumatic tires, the combination with a tubular stem recessed at its outer end, of a perforated cover adapted to screw upon the end of the tubular stem, a disk within the recessed end of the tubular stem adapted to be seated against the end of said cover, a cap screwing upon the cover and perforated, and a device extending through and seated within the cap and acted upon by the disk to simultaneously shut off the escape of air at the opening in the cap with the closing of the opening in the cover, substantially as and for the purposes set forth.

2. In a valve for pneumatic tires, the combination with the tubular stem $b$ recessed at 2 at its outer end and transversely slotted at 3, and a disk $c$ received within the recessed end, of a cover $d$ centrally perforated, and screwing upon the end of the tubular stem, a centrally-perforated cap $f$ screwing upon the end of the cover $d$, the stem $e$, disk $e'$ and washer 4, and the tapering head $h$ passing through the opening in the cap and screwing upon the end of the stem $e$, said stem resting upon the disk $c$ when the disk is seated upon the flat under side of the cover $d$, and the washer 4 being simultaneously pressed against the end of the cap $f$ to form a double seal to prevent the escape of the confined air of the tire, and at the same time a means for providing, by the pressure of the finger against the head, for the escape of the air at pleasure, substantially as set forth.

3. In a valve for pneumatic tires, the combination with the tubular stem having a transverse slot, of a perforated cover screwed thereon and having a screw-thread to connect with a pump, a disk valve between the end of the stem and the under side of the cover, a removable perforated cap screwed on the cover, a valve adapted to close against the under side of the cap and its stem extending through the cap and nearly to the disk valve, so that the two valves can be opened by hand, substantially as specified.

Signed by me this 7th day of October, 1896.

EMIL FRITSCHLE.

Witnesses:
 GEO. T. PINCKNEY,
 HAROLD SERRELL.